US009324039B2

United States Patent
Vangati et al.

(10) Patent No.: US 9,324,039 B2
(45) Date of Patent: Apr. 26, 2016

(54) INCREMENTAL UPDATES FOR ORDERED MULTI-FIELD CLASSIFICATION RULES WHEN REPRESENTED BY A TREE OF LONGEST PREFIX MATCHING TABLES

(71) Applicant: LSI Corporation, San Jose, CA (US)

(72) Inventors: Narender R. Vangati, Austin, TX (US); Rajarshi Bhattacharya, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 391 days.

(21) Appl. No.: 14/097,763

(22) Filed: Dec. 5, 2013

(65) Prior Publication Data

US 2015/0149395 A1 May 28, 2015

Related U.S. Application Data (60) Provisional application No. 61/909,833, filed on Nov. 27, 2013.

(51) Int. Cl.
*G06F 17/00* (2006.01)
*G06N 5/02* (2006.01)
*G06N 99/00* (2010.01)

(52) U.S. Cl.
CPC .................. *G06N 99/005* (2013.01)

(58) Field of Classification Search
USPC ........................................................ 706/47
See application file for complete search history.

(56) References Cited

U.S. PATENT DOCUMENTS

| 5,509,006 A | 4/1996 | Wilford et al. ................. 370/60 |
| 6,651,096 B1 | 11/2003 | Gai et al. ....................... 709/223 |
| 6,754,735 B2 * | 6/2004 | Kale ....................... G06F 13/28 710/22 |
| 6,996,662 B2 | 2/2006 | Miller et al. .................. 711/108 |
| 7,075,926 B2 | 7/2006 | Cathey et al. ................. 370/389 |

(Continued)

OTHER PUBLICATIONS

Implementation of Pointer Logic for Automated Verification Zhifang Wang; Yiyun Chen; Zhenming Wang; Wei Wang; Bo Tian Young Computer Scientists, 2008. ICYCS 2008. The 9th International Conference for Year: 2008 pp. 2295-2301, DOI: 10.1109/ICYCS.2008.168 IEEE Conference Publications.*

(Continued)

*Primary Examiner* — Michael B Holmes (57) ABSTRACT

An apparatus includes a memory and a processor. The memory may be configured to store at least a portion of a multi-level tree representation of an ordered multi-field rule-based classification list. The tree representation includes at least one non-leaf level and one or more leaf levels. Each entry in the at least one non-leaf level contains a count value indicating a number of rules having a matching field. Entries in at least one of the one or more leaf levels include rule pointers arranged in priority order. The processor may be configured to incrementally insert or delete rules, while preserving ordering semantics of the tree representation.

17 Claims, 6 Drawing Sheets

(56) References Cited

U.S. PATENT DOCUMENTS

| | | | | |
|---|---|---|---|---|
| 7,149,216 | B1 | 12/2006 | Cheriton | 370/392 |
| 7,246,102 | B2 * | 7/2007 | McDaniel | G06N 5/02 370/351 |
| 7,644,085 | B2 * | 1/2010 | Miller | H04L 63/0263 707/797 |
| 7,822,589 | B2 * | 10/2010 | Bhattacharya | G06F 17/5022 703/14 |
| 7,930,691 | B2 * | 4/2011 | Bhattacharya | G06F 8/67 717/168 |
| 8,181,258 | B2 * | 5/2012 | Kumar | H04L 63/0227 713/182 |
| 8,516,004 | B2 | 8/2013 | Mazzagatti | 707/797 |
| 9,081,742 | B2 * | 7/2015 | Sonnier | G06F 15/167 |
| 2002/0085560 | A1 | 7/2002 | Cathey et al. | 370/392 |
| 2003/0005146 | A1 | 1/2003 | Miller et al. | 709/238 |
| 2003/0188198 | A1 | 10/2003 | Holdsworth et al. | 713/201 |
| 2004/0078683 | A1 | 4/2004 | Buia et al. | 714/37 |
| 2004/0260818 | A1 | 12/2004 | Valois et al. | 709/229 |
| 2005/0114655 | A1 | 5/2005 | Miller et al. | 713/163 |
| 2005/0114657 | A1 | 5/2005 | Kumar et al. | 713/164 |

OTHER PUBLICATIONS

Pointer adaptation and pruning of min-max fuzzy inference and estimation Arabshahi, P.; Marks, R.J., II; Oh, S.; Caudell, T.P.; Choi, J.J.; Bong-Gee Song Circuits and Systems II: Analog and Digital Signal Processing, IEEE Transactions on Year: 1997, vol. 44, Issue: 9 pp. 696-709, DOI: 10.1109/82.624992 IEEE Journals & Magazines.*

Grid of Segment Trees for Packet Classification Yeim-Kuan Chang; Yung-Chieh Lin; Chen-Yu Lin Advanced Information Networking and Applications (AINA), 2010 24th IEEE International Conference on Year: 2010 pp. 1144-1149, DOI: 10.1109/AINA.2010.38 IEEE Conference Publications.*

Efficient association rule mining using indexing support Rao, V.V. Recent Trends in Information Technology (ICRTIT), 2011 International Conference on Year: 2011 pp. 683-688, DOI: 10.1109/ICRTIT.2011.5972386 IEEE Conference Publications.*

* cited by examiner

INCREMENTAL UPDATES FOR ORDERED MULTI-FIELD CLASSIFICATION RULES WHEN REPRESENTED BY A TREE OF LONGEST PREFIX MATCHING TABLES

This application relates to U.S. Provisional Application No. 61/909,833, filed Nov. 27, 2013, which is hereby incorporated by reference in its entirety.

FIELD OF THE INVENTION

The invention relates to network processors generally and, more particularly, to a method and/or apparatus for implementing incremental updates for ordered multi-field classification rules when represented by a tree of longest prefix matching (LPM) tables.

BACKGROUND

Ordered multi-field rules-based classifications are an important part of any network access/routing environment. Rules are defined in priority order across multiple fields in a packet and the field values can have wild card bits like subnets. Incoming packets are matched with the rules in priority order and an action determined by the first rule matching each packet is taken. Ordered multi-field rules-based classification is used in multiple areas such as access control lists (ACLs), policy based routing, packet filtering, software defined networks, and so on. As network speeds increase and protocols become more complex, fast updating of these rules becomes more and more important with applications such as open flow and software defined networks needing update rates of more than thousands per second. Instead of matching the incoming packet with the rules one by one, the rules are organized as a tree of longest prefix matching (LPM) tables chained together to simulate ordered matching. The process of matching an action to a packet traverses the tree ending up with the action of the first rule that matches the packet. The entire set of rules is analyzed for field value relationships to derive the tree structure. Whenever there is an update, the new rule set is analyzed and a new tree is generated. The conventional rebuild approach limits how fast updates can be made and uses a large amount of transient memory to build a new tree and atomically switch to the new tree before deleting the old tree.

It would be desirable to have a method and/or apparatus for implementing incremental updates for ordered multi-field classification rules when represented by a tree of longest prefix matching (LPM) tables without having to rebuild the entire tree.

SUMMARY

The invention concerns an apparatus including a memory and a processor. The memory may be configured to store at least a portion of a multi-level tree representation of an ordered multi-field rule-based classification list. The tree representation includes at least one non-leaf level and one or more leaf levels. Each entry in the at least one non-leaf level contains a count value indicating a number of rules having a matching field. Entries in at least one of the one or more leaf levels include rule pointers arranged in priority order. The processor may be configured to incrementally insert or delete rules, while preserving ordering semantics of the tree representation.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing incremental updates for ordered multi field classification rules when represented by a tree of longest prefix matching (LPM) tables that may (i) use software routines instead of expensive specialized hardware (e.g., TCAMs), (ii) perform incremental insertions and deletions of rules, (iii) increase update rates significantly, (iv) reduce memory cost to an incremental basis by eliminating the need to keep two copies of the tree during the switch over, (v) fit in with additional software extensions to the standard logic of node compression to build a graph structure and also organizing rules as individual sets to increase build time and aid management, and/or (vi) be implemented as one or more integrated circuits. In various embodiments, a method is implemented that allows incrementally updating a tree structure (e.g., of longest prefix matching tables) with insert and delete operations without having to rebuild the entire tree. The method in accordance with embodiments of the invention significantly increases update rates to an order of LPM updates and also reduces peak memory usage.

In various embodiments, a tree of longest prefix matching (LPM) tables in accordance with an embodiment of the invention is used to represent a list of ordered multi-field classification rules, while eliminating the need to rebuild the tree on every update (e.g., rule insertion and/or deletion). In various embodiments, extensions to the data structure and new schemes in accordance with embodiments of the invention allow rules to be inserted and/or deleted incrementally, while preserving the ordering semantics of the tree representation. A process in accordance with an embodiment of the invention significantly increases update rates and also eliminates doubling memory usage during the rebuild since only individual paths get updated, keeping the ordering semantics intact.

Figure 1:
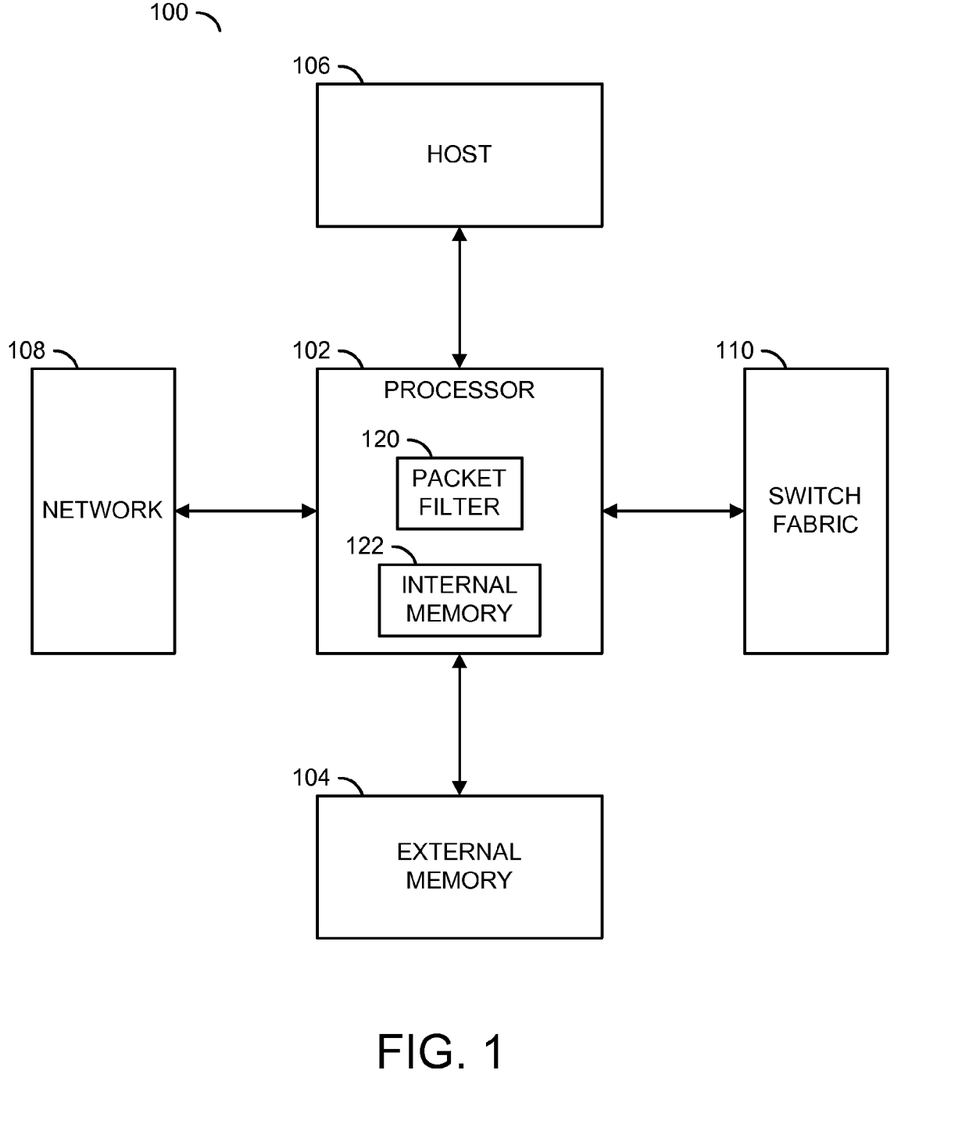
FIG. 1 is a diagram illustrating an example of a system in which an embodiment of the invention is implemented.

Referring to FIG. 1, a diagram is shown illustrating an example of a system 100 in which an embodiment of the invention may be implemented. In various embodiments, the system 100 implements an information processing system. The system 100 includes a block (or circuit) 102, a block (or circuit) 104, a block (or circuit) 106, a block (or circuit) 108, and a block (or circuit) 110. The circuit 102 implements a network processor. The circuit 104 implements an external memory coupled to the circuit 102. The circuit 106 represents a host coupled to the circuit 102. The circuit 102 is configured to provide an interface between a network 108, over which packets or other protocol data units (PDUs) are carried, and a switch fabric 110, which controls switching of PDU data. In various embodiments, the circuit 102 and the associated external memory 104 are implemented as one or more integrated circuits. In various embodiments, the one or more integrated circuits may be installed, for example, on a line card or port card of a router or switch. In such a configuration, the switch fabric 110 is generally considered to be a part of the router or switch.

In various embodiments, the circuit 102 comprises a block (or circuit) 120 and a block (or circuit) 122. The circuit 120 implements a packet filter. The circuit 122 implements an internal memory. One or both of the internal memory 122 and the external memory 104 may be utilized to implement otherwise conventional network processor memory elements such as PDU buffer memory, queuing and dispatch buffer memory, etc. In some embodiments, the host 106 is configured to communicate with the circuit 102 over a standard bus architecture (e.g., a peripheral component interconnect (PCI) bus, peripheral component interconnect express (PCIe) bus, etc.). In some embodiments, the host 106 is configured to communicate with the circuit 102 using a standard or proprietary wireless protocol. However, any mechanism suitable for communicating the tree structure described below may be implemented to meet the design criteria of a particular implementation.

In various embodiments, the circuit 120 is configured to perform packet filtering operations utilizing a tree representation of a multi-level rules-based classification list. The manner in which the tree representation is generated is described in greater detail below in connection with FIGS. 2 and 3. In addition to or in place of the circuit 120, other types of processing elements (e.g., ACL-based, etc.) may be implemented. Also, although identified as a packet filter, the circuit 120 may be more generally utilized in the circuit 102 to perform filtering on other types of PDUs.

The particular arrangement of system elements shown in FIG. 1 is presented by way of illustrative example only. More particularly, as previously noted, various embodiments can be implemented in any type of processor, and are not limited to any particular PDU processing application. The system 100 and the circuit 102 as illustrated in FIG. 1 are considerably simplified for clarity of discussion, and may include other elements in addition to or in place of those specifically shown, including one or more elements of a type commonly found in a conventional implementation of such a system and network processor. For example, the circuit 102 may also include a classifier, a traffic manager, a scheduler, queuing and dispatch logic, one or more memory controllers, interface circuitry for interfacing the circuit 102 with the network 108, the switch fabric 110, the host 106 and other external devices, as well as other conventional elements not explicitly shown in the figure. These and other conventional elements, being well understood by those skilled in the art, are not described in detail herein.

In various embodiments, the functionality of the circuit 102 as described herein may be implemented at least in part in the form of software program code. For example, the packet filter 120 or other type of ACL-based functionality may be implemented at least in part utilizing elements that are programmable via instructions or other software and/or firmware that may be supplied to the circuit 102 via the host 106 or other suitable mechanism. In some embodiments, the functionality of the circuit 102 is wholly implemented in hardware (e.g., as hardwired function blocks in one or more integrated circuits). In embodiments involving software and/or firmware, a general purpose core with standard code may be configured (programmed) to implement a tree walking process and data structures in accordance with embodiments of the invention.

In an illustrative embodiment, software in the host 106 is configured to generate a tree representation of a multi-level rules-based classification, and the tree representation is subsequently downloaded from the host 106 into memory circuitry associated with the circuit 102. The memory circuitry associated with the circuit 102 may comprise internal memory 122, external memory 104, or a combination of both internal and external memory. The tree representation is utilized by the circuit 102 (e.g., via the packet filter circuit 120) to perform corresponding operations (e.g., packet filtering). The invention is not limited with regard to the particular packet filtering or other operations that are performed utilizing the tree representation, and such operations can be performed in an otherwise conventional manner. In other illustrative embodiments, the tree representation may be generated elsewhere in the system 100, such as in the circuit 102 itself, or using a combination of system elements, such as the host 106 and the circuit 102.

In various embodiments, a set of rules of a multi-level rules-based classification is determined, and the rules are processed to generate a multi-level tree representation of the multi-level rules-based classification. As noted above, the rule determination and processing may be implemented in the host 106, in the circuit 102, in a combination of these elements, or in one or more other system elements. Generally, each of one or more of the levels of the tree representation is associated with a corresponding one of the fields of the rules. In addition, at least one level of the tree representation other than a root level of the tree representation comprises a plurality of nodes, with at least two of the nodes at that level each having a separate matching table associated therewith.

The matching tables may comprise, by way of example, longest prefix matching (LPM) tables. Network processors designed for use in routing applications are typically well suited for managing, searching and otherwise processing LPM tables, although other types of matching tables can be used to meet the design criteria of a particular implementation. In an exemplary implementation (described below in conjunction with FIG. 10), the fields of the rules include first and second fields, corresponding to respective source and destination address fields utilized in Internet Protocol (IP) packet filtering.

In various embodiments, a multi-level tree representation is generated, in which each of one or more of the levels of the tree representation is associated with a corresponding one of the fields of the rules. As noted above, the tree representation is configured such that at least one level of the tree representation other than a root level of the tree representation comprises multiple nodes each having a separate LPM table or other type of matching table associated therewith. This arrangement of LPM tables is also referred to herein as "in-line chaining" of LPM tables, since an LPM table at a given level of the tree representation is associated not with all of the field values of that level but only a subset of the field values as applicable to the matching value in the previous level.

In packet filtering embodiments, the tree representation of the rule set provides enhanced packet filtering performance in the packet filter circuit 120 of the network processor circuit 102. Also, by eliminating the need for a shared number space for each field, techniques in accordance with an embodiment of the invention facilitate updates or other maintenance operations performed on the rule list. As a result, reduced turn-around time is provided for tree changes, particularly in environments where the rules are grouped by customer, virtual local area network (VLAN), session or similar parameters.

Figure 2:
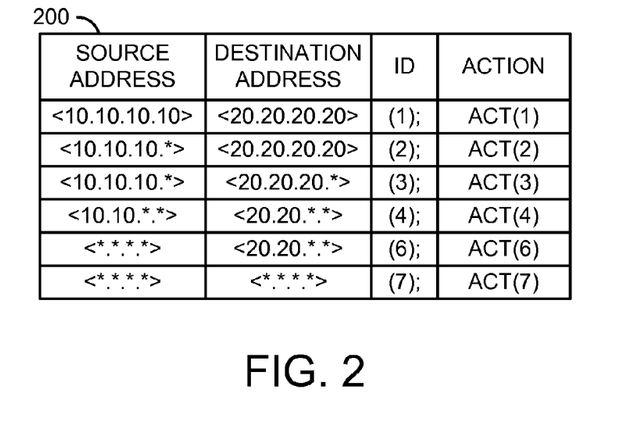
FIG. 2 is a diagram illustrating an example of an ordered rule list.

Referring to FIG. 2, a diagram of a rule list 200 is shown illustrating an example of an initial set of rules. In various embodiments, each rule in the rule list 200 is denoted by a corresponding rule identifier (ID). The rule IDs (e.g., (1), (2), ..., (7)) do not need to be sequential (e.g., rule 4 is followed by rule 6), but are ordered in the list in descending priority (e.g., higher priority rules have lower IDs). In some embodiments, each rule includes four fields: a source address field, a destination address field, an identifier field, and an action field. The action field specifies an action or actions (e.g., ACT(x)) corresponding to the particular rule. However, other numbers of fields may be implemented accordingly to meet design criteria of a particular implementation. In some embodiments, the list 200 is configured for performing packet filtering based on Internet Protocol (IP) version 4 (IPv4) source and destination addresses.

Figure 3:
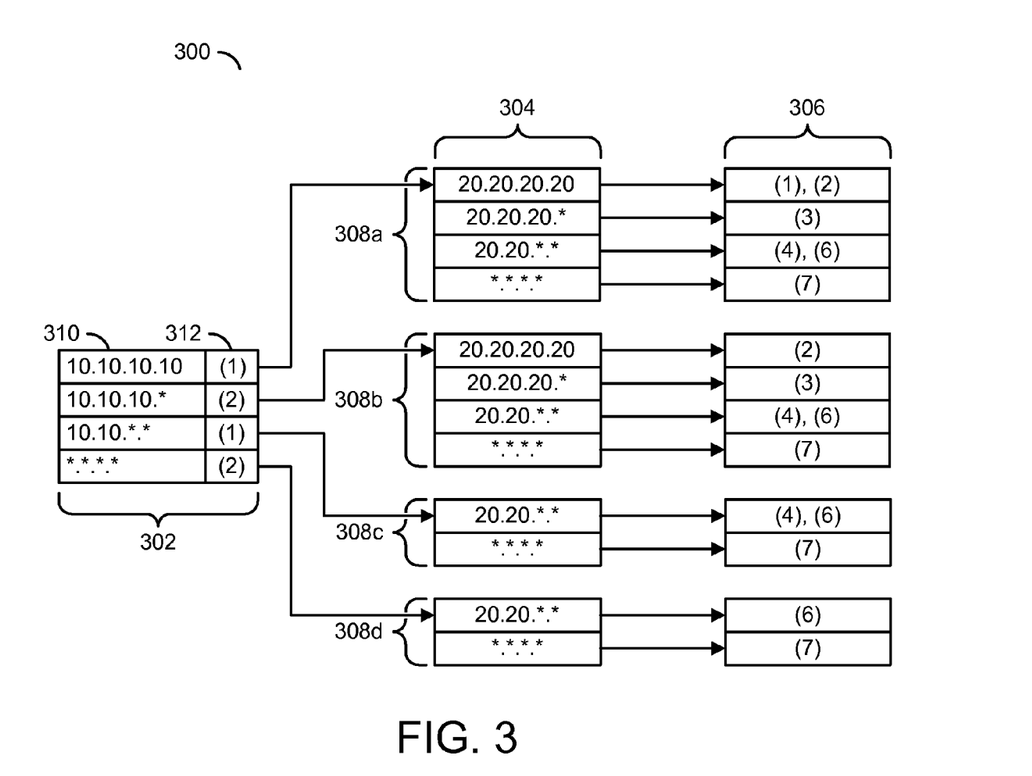
FIG. 3 is a diagram illustrating a tree representation of the rule list of FIG. 2.

Referring to FIG. 3, a diagram is shown illustrating an example tree representation 300 in accordance with an embodiment of the invention. In various embodiments, the tree representation 300 is generated by processing a corresponding rule list 200 (e.g., using a tree walking process). In one example, in some embodiments, the tree representation 300 is utilized to perform packet filtering operations in the packet filter circuit 120 of the network processor circuit 102. In an illustrative example embodiment, the tree representation 300 includes three levels: a first non-leaf level 302 (e.g., Level 1), a first leaf level 304 (e.g., Level 2), and a second leaf level 306 (e.g., Level 3). Levels 1 and 2 are associated with the source address field and destination address field, respectively, of the rule list 200. Each of the leaf nodes of Level 3 contains a rule pointer or pointers associating the node to a respective rule ID or IDs and the particular corresponding rule action or actions.

In various embodiments, each entry in the first (non-leaf) level of the tree, Level 1, includes a field 310 and a field 312. Each field 310 corresponds to a distinct source address in the first field of the six entries in the rule list 200. Each field 312 contains a count value indicating the number of rules in the rule list 200 associated with the particular non-leaf node. The non-leaf level 302 may be viewed as comprising a longest prefix matching (LPM) table or other type of matching table, although this is not a requirement of the invention. Similarly, the non-leaf level 302 may be viewed as comprising only a single node having multiple values associated therewith, although again this is not a requirement.

The second level 304 includes a plurality of nodes 308a, ..., 308d, with each of the nodes 308a, ..., 308d having a separate LPM table associated therewith. Each of the LPM tables associated with the nodes 308a, ..., 308d represents at least a portion of a subtree of a particular one of the four distinct source address values in the non-leaf level 302. The distinct source address values thus form a root level of the tree representation 300, and each source address value has an associated Level 2 subtree with the destination addresses to be examined if the corresponding source address matches the source address of a particular packet. The term "subtree" as used in this example may be viewed, in the context of the illustrative embodiment, as comprising only the corresponding Level 2 LPM table for a given node, or as comprising the LPM table and any associated Level 3 indices (e.g., rule pointers to entries in the rule list 200).

By way of example, when a source address of 10.10.10.10 is matched for the first field, the Level 1 entry points to the LPM table 308a for matching the destination address, where the values of interest are only the 20.20.20.20, 20.20.20.*, 20.20.*.*, and *.*.*.* values. Similarly, each of the other Level 2 nodes has an associated LPM table which includes only those values that are of interest given the corresponding source address match obtained at Level 1. The destination address values in the separate LPM tables 308a, ..., 308d of Level 2 are arranged in order of decreasing specificity (e.g., with the most specific values listed first in each table). When LPM table entries with equal specificity are present, the equal specificity table entries may be arranged in any order in relation to one another.

A tree representation such as that shown in FIG. 3 may be stored in memory circuitry associated with the circuit 102. For example, the representation may be stored in the form of information characterizing the nodes and respective interconnections with other nodes, with such information including, for a given node, one or more field values associated with that node, arranged as a matching table or otherwise, as well as one or more pointers to other nodes to which the given node is connected in the tree representation. The term "tree representation" as used herein is intended to include, without limitation, such stored information characterizing the nodes and the respective interconnections with other nodes.

An example process for generating the tree representation 300 in accordance with an embodiment of the invention may be described with reference to FIGS. 2 and 3. In this example, source and destination address fields are used for simplicity and clarity of illustration, although it is to be appreciated that embodiments of the invention are not limited to use in the Internet protocol (IP) packet filtering context. Generally, the tree representation 300 is constructed by processing the rule set 200. At the root level, a first node is created for a given value in the first field of the first rule of the rule set. The remaining field values of the first rule, and the field values of the remaining rules, are then processed sequentially, with each value being compared to existing values at the appropriate node(s) of the tree. More particularly, a given value may be compared with each existing value to determine if a match exists.

In some embodiments, only the smallest number of bits necessary to determine if a match exists are compared. For example, a given IP address value of 10.*.*.* when compared to an existing value 20.*.*.* will not result in a match, but the given address value of 10.*.*.* when compared to an existing value 10.10.*.* will result in a match since the smallest "signature" of the given address value is 10, which matches the existing value. Similarly, a given address value of 10.20.*.* when compared to an existing value 10.*.*.* will result in a match.

If there is no match, the given value is simply added to the current node and the process proceeds to the corresponding subtree (NULL) to process the rest of the fields of the rule. If there is a match between the given value and an existing value, the process proceeds on one of three possible paths. If the values are identical (e.g., an exact match), the process follows the subtree for that value to apply the rest of the fields of the rule. Once this is done, the process returns to process an additional rule, if any. If the given value is more specific than the existing value (e.g., a given value 10.20.*.* is more specific than an existing value 10.*.*.*), then a copy of the subtree for the existing value (e.g., 10.*.*.*) is made, and the rest of the fields in the rule are applied to this subtree copy. It is possible that this subtree copy may also completely supercede the remaining fields, in which case nothing further needs to be done for the rule. But if the subtree copy is changed in any way, for example, if the remaining fields cause the subtree copy to be modified, the current field value (e.g., 10.20.*.*) is added to the corresponding node and the node is connected to the modified subtree copy. In either case, once this is done, the process returns to process an additional rule, if any. If the given value is less specific than the existing value (e.g., a given value 10.*.*.* is less specific than an existing value 10.20.*.*), the process proceeds down the subtree. Once a point is reached where the given value is no longer less specific than an existing value, the given value is added to the corresponding node, and the process proceeds to the subtree of that node to process the remaining field values of the rule.

At each node of the tree, the values are preferably organized such that the most specific values (e.g., the values having the lowest number of "don't care" bits) are at the top. This ensures that the process implements the comparisons using the most specific values first, since in two of the three cases described above detection of a match avoids further processing.

A tree representation constructed in the manner described above fully represents the relationships between the rules and the corresponding field values. In such a representation, each node of one or more levels of the tree representation 300 may be implemented as an LPM table that contains only those values that are of interest at that point in the traversal. The tree 300 can be traversed in one direction for matching an incoming packet without backtracking and guaranteed to find the action for the highest priority matching rule. The tree representation is implemented using in-line chaining of LPM tables. This technique completely eliminates the need to maintain separate LPM tables for each field, as in a per-field LPM approach. This technique also eliminates the associated lookup operations and result concatenations, thereby providing a considerable performance improvement.

The structure of the tree representation 300 represents a derived relationship of the rules where some rules may not be represented in one or all paths because the particular rules are subsumed by higher precedence (lower rule ID) rules. To support incremental rule insertions and deletions, in various embodiments, the tree structure is further enhanced to contain sufficient information to identify the closest parent or subsumed rule so that when a rule is deleted, the resulting structure can be placed in a condition as if the deleted rule was never present or added in the first place.

Since a field value is added to a node only if the field value does not already exist, each entry in a non-leaf level is modified to contain a reference count indicating how many rules in the respective path have the same exact value (illustrated as the field 312 in FIG. 3). The reference count allows determination of whether an entry can be completely deleted as rules get deleted and the reference count goes to zero. In conventional schemes, the leaf nodes normally contain the action for the matching rule. When inserting rules in the middle of the list 200, a determination needs to be made whether to replace an existing action. The determination needs to be based on rule ID and the lower the rule ID, the higher the priority. In various embodiments, instead of containing the action, leaf nodes of the tree representation 300 contain a pointer to the matching rule from which the rule ID and action can be obtained (derived). For rule deletion, knowledge about which rule action is to replace the action associated with the deleted rule is needed. If a matching parent rule has the same value for the last field, this relationship needs to be derivable so that the relationship can be replaced appropriately when deleting the rule. So, each leaf node potentially also contains a list of parent rule pointers in ID order. Note that this is only for the case where the parent has the same value for the last field and thus is not represented by another LPM in this node. If the parent does not have the same value at the leaf, the parent would be represented in the tree and thus the parent can always be found.

Given the enhanced data structure in accordance with embodiments of the invention, new rules on modifying the tree structure can be derived. The overall process of walking the tree structure by matching an input field value to existing values is the same as given above. The types of changes that are made are based on the particular operation (e.g., inserting a rule, deleting a rule, etc.).

Inserting a rule at an index changes the rule IDs of all current rules from that location onwards. Since the precedence of the actions at the end of the tree structure is based on rule IDs (priorities), we first need to change the rule IDs of all the subsequent rules. Since rules are kept separately and the tree structure simply points to matching rules, the update process is very straightforward. After this is done, rule insertion to the tree structure can be made following the tree walking process. The following extensions to the above process apply:

1. Non-leaf node, exact match. Update the reference count. The reference count keeps track of when the value can be deleted on rule deletion.

2. Leaf node, exact match. If the rule ID of the first matching rule is less than the given rule ID, simply add the rule to the list. If the rule ID of the first matching rule is greater than the given ID, the rule becomes the first matching rule.

3. Leaf node, child pattern match. If the rule ID of the first matching rule is less than the given rule, nothing needs to be done. A new pattern will be added later on anyway. If the rule ID of the first matching rule is greater than the given rule, add the rule pointer before the first matching rule.

Deleting a rule changes the rule IDs of all subsequent rules as well. The rule IDs of all subsequent rules needs to be updated in the rule list after the tree structure is modified. To delete a rule, the tree is walked as normal, except that no new nodes are created. The following extensions to the above process apply:

1. Leaf node, child pattern match. If the rule ID of the first matching rule is the given rule ID, remove the rule ID, and replace the rule ID with the next rule from the list. Here, this list cannot be empty since this is not an exact match. If the rule ID of the first matching rule is not the given ID, the given ID could be in the list. If the given ID is found, simply remove the given ID from the list.

2. Leaf node, exact match. If the rule ID of the first matching rule is the given ID, remove the rule ID of the first matching rule, and replace the rule ID of the first matching rule with the next rule pointer from the list unless the list is empty in which case, the given rule was the only rule affecting this node and the field value can be removed from the node. If the rule ID of the first matching rule is not the given ID, the rule ID will be in the list, and can simply be removed from the list.

3. Non-leaf node, exact match. Decrement the reference count. If the reference count goes to zero, the pattern can be removed from the node. This implies that the subtree the node is pointing to can also be removed.

Once the rule is deleted from the tree structure, the rule list can be walked from that rule ID and the IDs of subsequent rules decremented.

The extensions and rules in accordance with embodiments of the invention are applicable even when building a compressed graph of LPM tables. The node compare process now needs to include reference counts and matching rule list.

Consider the following example using the rules as listed in FIG. 2 to represent an ordered rule list for IPv4 source and destination addresses. The first column is the source address, the second column is destination address, the third column is the rule ID, and the fourth column is the corresponding action or actions to take in response to a match. In order to show how inserts and deletes affect an existing tree structure, specific examples of operations resulting in a changes to the tree structure of FIG. 3 are shown in FIGS. 4-9.

In FIG. 3, the source address values form the root of the tree representation 300 and each source address has a subtree with the destination addresses to look for if the respective source address matches. The values for the first field also have reference counts after the pattern (e.g., the field 312). As shown in FIG. 3, the fields containing the patterns 10.10.10.* and *.*.*.* have reference counts of 2. For the leaf nodes, some of the patterns point to a list of ordered matching rules. For example, the destination address of 20.20.20.20 corresponding to source address 10.10.10.10 points to rules 1 and 2 as matching rules.

Figure 4:
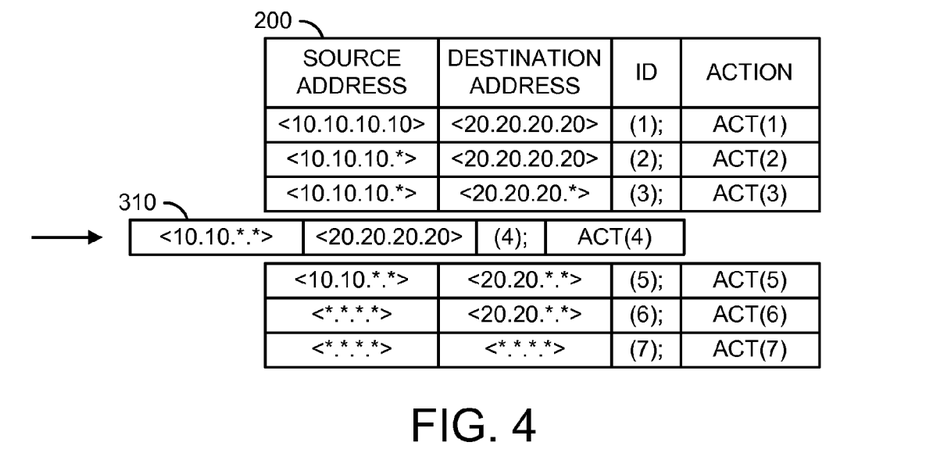
FIG. 4 is a diagram illustrating a rule insertion in accordance with an embodiment of the invention.
Figure 5:
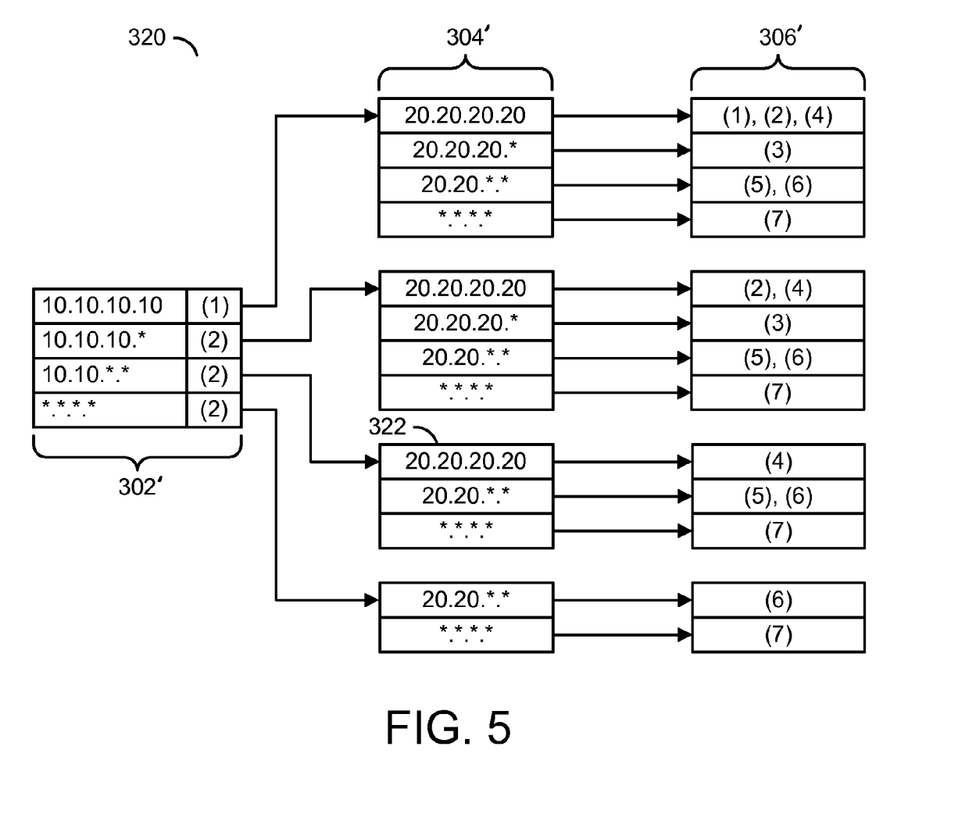
FIG. 5 is a diagram illustrating an updated version of the tree representation of FIG. 3 after the rule insertion in accordance with an embodiment of the invention.

Referring to FIGS. 4 and 5, diagrams are shown illustrating a process for inserting a rule in accordance with an embodiment of the invention. In FIG. 4, a rule 310 having associated rule ID 4 is inserted in the list 200. Because the rule 310 is higher priority than (being inserted before) the existing rule with ID 4, the existing rule with ID 4 is renumbered to a higher (lower priority) rule ID (e.g., 5). In FIG. 5, a tree representation 320 is shown illustrating the result of the insertion of the rule 310. As the first field is applied to the root node, the insertion process walks the paths of 10.10.10.10 and 10.10.10.*. Since an exact match is found for 20.20.20.20 for the next field, the new rule is simply added as one of the matching rules in the right order. The process then goes down to the LPM table for the root field containing the source address pattern 10.10.*.* and adds an entry 322 for the destination address 20.20.20.20 as a more specific pattern to match.

As shown in column 306' in FIG. 5, a pointer for the rule 310 associated with ID 4 is added to the list of matching rules for the paths 10.10.10.10→20.20.20.20 and 10.10.10.*→20.20.20.20, a new path 10.10.*.* →20.20.20.20 is created, the pointers for the previous rule associated with ID 4 are adjusted to reflect the change to ID 5, and the reference count of the root field 10.10.*.* is incremented (e.g., to 2).

Figure 6:
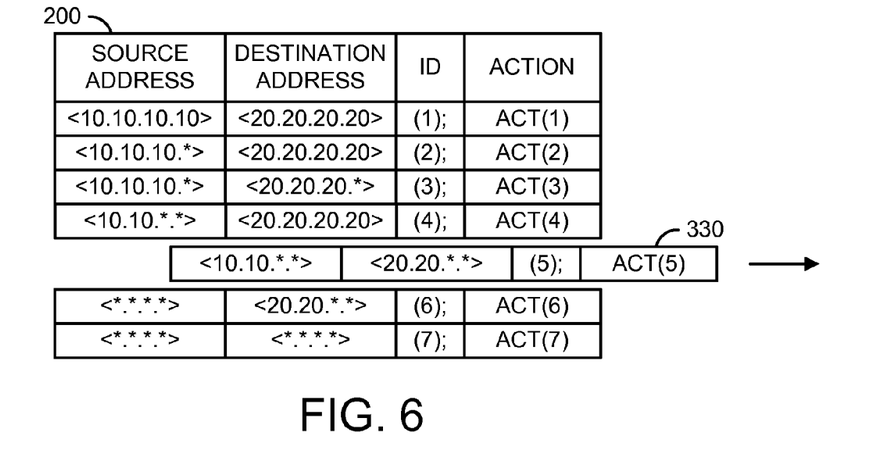
FIG. 6 is a diagram illustrating a rule deletion in accordance with an embodiment of the invention.
Figure 7:
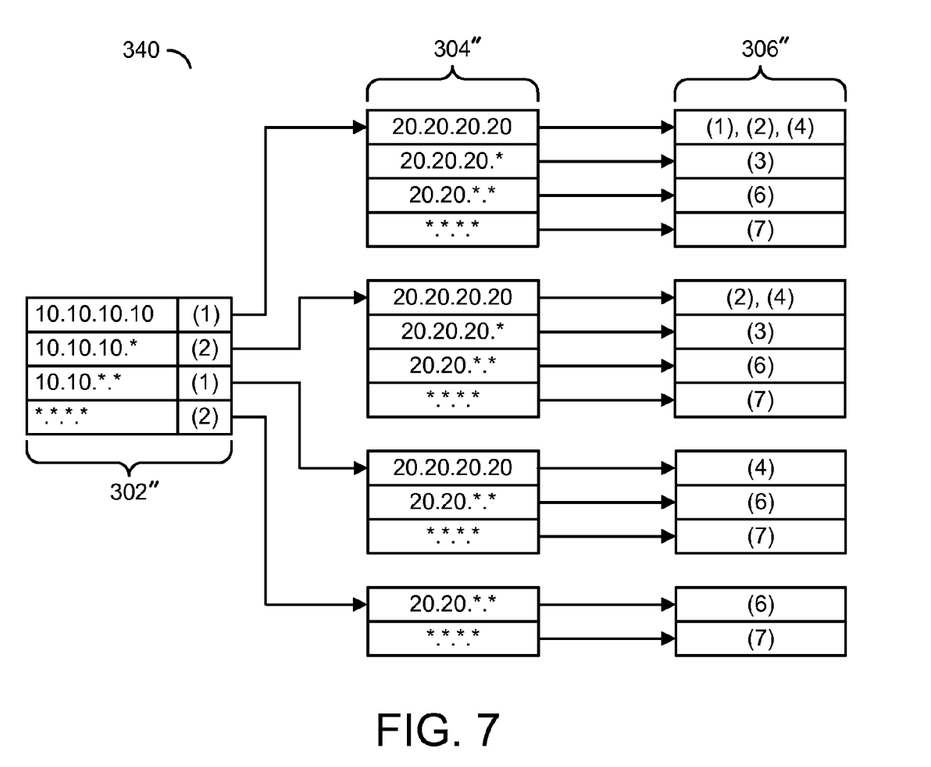
FIG. 7 is a diagram illustrating an updated version of the tree representation of FIG. 5 after the rule deletion in accordance with an embodiment of the invention.

Referring to FIGS. 6 and 7, diagrams are shown illustrating an example process for deleting a rule in accordance with an embodiment of the invention. In FIG. 6, a diagram is shown illustrating removal of a rule 330 from the rule list 200. The deleted rule 330 is shown as the rule associated with ID 5. The removal of the rule 330 affects the paths for 10.10.10.10, 10.10.10.*, and 10.10.*.*. A resulting modified tree structure 340 is shown in FIG. 7. In the tree structure 340, the matching rule associated with ID 5 is removed in the matching paths and the reference count of root entry containing the source address pattern 10.10.*.* is decremented.

Figure 8:
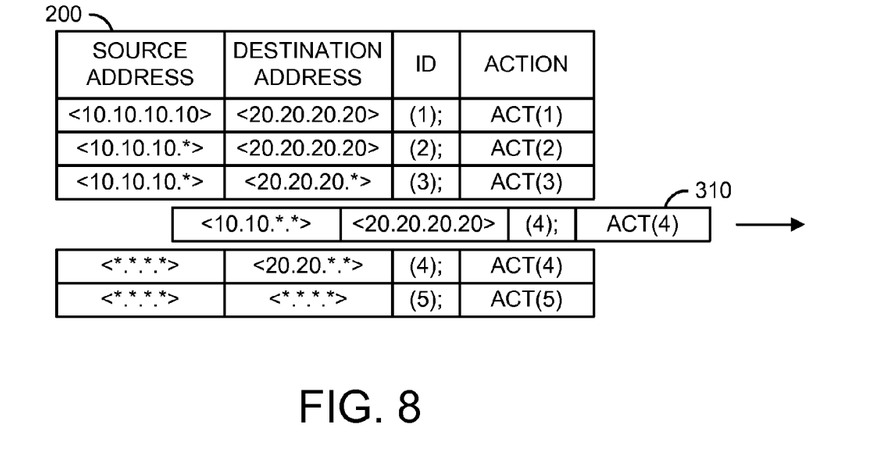
FIG. 8 is a diagram illustrating another example deletion in accordance with an embodiment of the invention.
Figure 9:
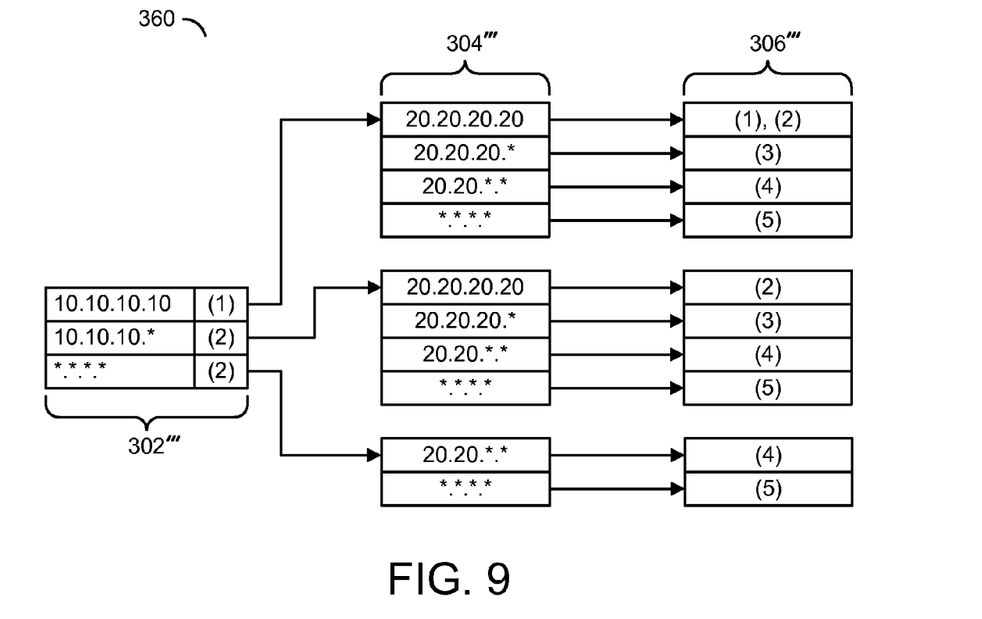
FIG. 9 is a diagram illustrating an updated version of the tree representation of FIG. 7 after the rule deletion in accordance with an embodiment of the invention.

Referring to FIGS. 8 and 9, diagrams are shown illustrating another example process involving deletion of the previously inserted rule 310 associated with rule ID 4. In addition to removing the rule 310, the process in accordance with an embodiment of the invention adjusts the rule IDs of the subsequent rules in the list 200 as well. A resulting tree structure 360 is shown in FIG. 9. The resultant tree structure 360 no longer contains the matching rule associated with the rule 310 in any path, and the root entry containing the source address pattern 10.10.*.* and the respective subtree 308c are removed as well. The pointers for the matching rules associated with the subsequent rules in the list 200 are adjusted to reflect the changes in rule IDs.

Figure 10:
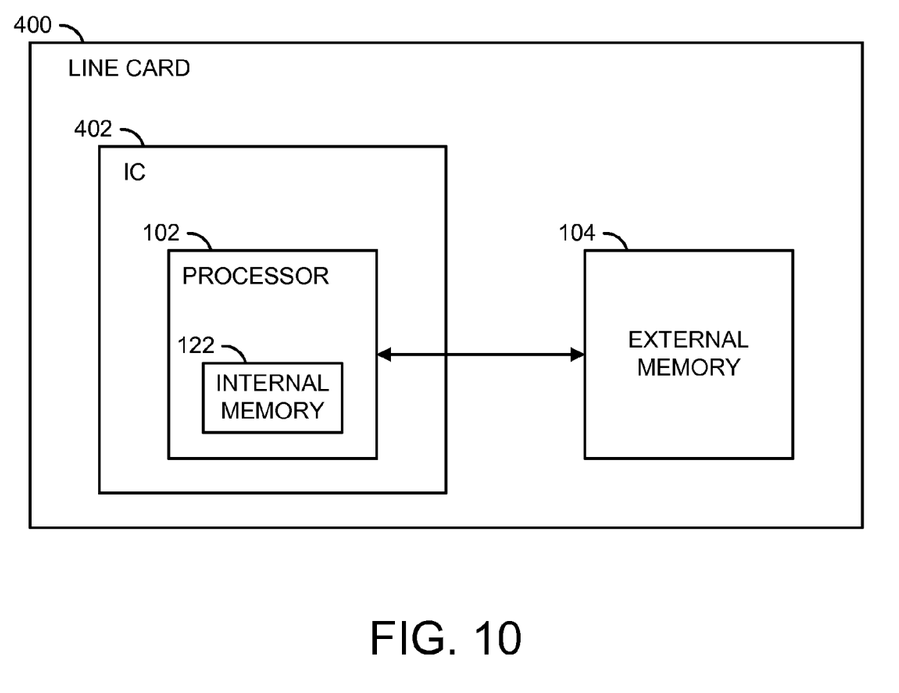
FIG. 10 is a diagram illustrating an example implementation of a network processor system as an integrated circuit installed on a line card of a router or switch.

Referring to FIG. 10, a diagram is shown illustrating an example implementation of a network processor system in accordance with an embodiment of the invention as an integrated circuit installed on a line card of a router or switch. FIG. 10 illustrates an example router or switch line card embodiment of a portion of the system 100 of FIG. 1. In some embodiments, the processing system comprises a line card 400 having at least one integrated circuit 402 installed thereon. The integrated circuit 402 comprises a network processor 102 which has internal memory 122. The network processor 102 interacts with external memory 104 on the line card 400. The above-noted host processor 106 may also be installed on the line card 400. A tree representation of a rule list (e.g., an ACL) may be stored in the internal memory 122, in the external memory 104, or using a combination of the internal and the external memory.

The portion of the processing system as shown in FIG. 10 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

It should be understood that the particular arrangements of elements shown in FIGS. 1 through 10 are by way of illustrative example only. More particularly, as previously noted, embodiments of the invention can be implemented in any type of system, utilizing any type of processor, and are not limited to use with packet filtering or any other particular ACL-based function. Also, as indicated previously, the system 100 and network processor circuit 102 may include other elements in addition to or in place of those specifically shown in the figures, including one or more elements of a type commonly found in a conventional implementation of such a system and network processor. These and other conventional elements, being well understood by those skilled in the art, are not described in detail herein.

The above-described embodiments of the invention are thus intended to be illustrative only. The particular ACL rules and corresponding tree representations shown in FIGS. 2 and 3, respectively, should be considered as non-limiting examples, and a wide variety of other rule sets, fields, tree representations, and matching tables can be used in implementing embodiments of the invention. For example, although each rule in the rule set of the illustrative embodiment of FIG. 2 includes the same number of fields, this is not a requirement of the invention, and there may be variation in the number of fields (e.g., multiple action fields, etc.) from rule to rule within a given rule set. The particular type and configurations of the matching tables, and the manner in which such tables are associated with nodes of a given level of a tree representation, may be varied in various embodiments of the invention. Also, the manner in which a tree representation is stored, processed and otherwise utilized by a network processor or other processor can vary depending upon the particular processing application and the particular characteristics of the processing function(s) used in the particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store at least a portion of a multi-level tree representation of an ordered multi-field rule-based classification list, the tree representation comprising at least one non-leaf level and one or more leaf levels, wherein each entry in the at least one non-leaf level comprises a count value indicating a number of rules having a matching field and entries in at least one of the one or more leaf levels comprise rule pointers arranged in priority order; and
a processor configured to incrementally insert or delete rules, while preserving ordering semantics of the tree representation.

2. The apparatus according to claim 1, wherein said processor is configured to preserve the ordering semantics of the tree representation by updating only individual paths of the tree representation.

3. The apparatus according to claim 1, wherein the processor is further configured to update the count value when a rule is inserted or deleted.

4. The apparatus according to claim 3, wherein the processor is further configured to update the rule pointers when rules are inserted or deleted.

5. The apparatus according to claim 1, wherein:
the ordered multi-field rule-based classification list comprises a plurality of rules, each of at least a subset of the rules having a plurality of fields and a corresponding rule ID; and
each of one or more of the levels of the tree representation is associated with a corresponding one of the fields and comprises one or more nodes each associated with a respective matching table comprising one or more entries each specifying a corresponding value for the corresponding field associated with the respective level.

6. The apparatus according to claim 5, wherein the matching tables comprise longest prefix matching (LPM) tables.

7. The apparatus according to claim 1, wherein the ordered multi-field rule-based classification list implements an access control list.

8. The apparatus according to claim 7, wherein the processor implements an access control list based function comprising packet filtering.

9. The apparatus according to claim 1, wherein the memory comprises at least one of an internal memory and an external memory of the processor.

10. The apparatus according to claim 1, wherein the processor comprises a network processor.

11. The apparatus according to claim 1, wherein the processor is implemented as an integrated circuit.

12. A method of incrementally updating a tree of longest prefix matching (LPM) tables representing a list of ordered multi-field classification rules comprising the steps of:

storing at least a portion of a multi-level tree representation of an ordered multi-field rule-based classification list in a memory, wherein the tree representation comprises at least one non-leaf level and one or more leaf levels, each entry in the at least one non-leaf level comprises a count value indicating a number of rules having a matching field, and entries in at least one of the one or more leaf levels comprise rule pointers arranged in priority order; and incrementally inserting or deleting rules, while preserving ordering semantics of the tree representation.

13. The method according to claim 12, wherein said ordering semantics of the tree representation are preserved by updating only individual paths of the tree representation.

14. The method according to claim 12, further comprising the step of:

generating said multi-level tree representation from said ordered multi-field rule-based classification list using one or both of a host processor and a network processor.

15. The method according to claim 12, further comprising updating one or both of the count values and the rule pointers when rules are inserted or deleted.

16. The method according to claim 12, wherein the ordered multi-field rule-based classification list implements an access control list.

17. The method according to claim 16, wherein the ordered multi-field rule-based classification list comprises a plurality of rules, each of at least a subset of the rules having a plurality of fields and a corresponding rule identifier (ID), each of one or more of the levels of the tree representation is associated with a corresponding one of the fields and comprises one or more nodes each associated with a respective matching table comprising one or more entries each specifying a corresponding value for the corresponding field associated with the respective level, and the plurality of fields comprise at least a source address field and a destination address field.

* * * * *